United States Patent [19]
Schmitt et al.

[11] Patent Number: 5,544,023
[45] Date of Patent: Aug. 6, 1996

[54] HORIZONTAL ZERO INDICATOR ASSEMBLY

[75] Inventors: Karl R. Schmitt, Rockford, Ill.; David M. Mosnot, Noblesville, Ind.

[73] Assignee: Textron Inc., Providence, R.I.

[21] Appl. No.: 273,317

[22] Filed: Jul. 11, 1994

[51] Int. Cl.⁶ .................................................. B60Q 1/04
[52] U.S. Cl. ........................... 362/66; 362/273; 362/424
[58] Field of Search .......................... 362/61, 66, 69, 362/80, 273, 289, 422, 423, 424, 428

[56] References Cited

U.S. PATENT DOCUMENTS

| | | | |
|---|---|---|---|
| 4,674,018 | 6/1987 | Ryder et al. | 362/424 |
| 4,893,219 | 1/1990 | Lisak | 362/66 |
| 4,939,945 | 7/1990 | Ryder et al. | 74/89.13 |
| 5,032,964 | 7/1991 | Endo et al. | 362/61 |
| 5,063,480 | 11/1991 | McMahan et al. | 362/61 |
| 5,067,052 | 1/1991 | Suzaki et al. | 362/61 |
| 5,077,642 | 12/1991 | Lisak | 362/66 |
| 5,121,303 | 6/1992 | Shirai et al. | 362/61 |
| 5,186,531 | 2/1993 | Ryder et al. | 362/66 |
| 5,309,780 | 5/1994 | Schmitt | 74/89.13 |
| 5,365,415 | 11/1994 | Schmitt et al. | 362/66 |

Primary Examiner—Stephen F. Husar
Attorney, Agent, or Firm—Trexler, Bushnell, Giangiorgi & Blackstone, Ltd.

[57] ABSTRACT

An indicator assembly, which is used with an adjusting mechanism, designates an initial or "zero" position of a movable headlamp component. The adjusting mechanism includes a housing, an adjusting screw which is disposed through the housing, and a driving mechanism which is operatively associated with the screw. A first end of the screw is operatively associated with a movable headlamp component. The indicator assembly includes a hollow, vial-like member which is attached to the housing and a follower member. The second end of the screw is enclosed within the hollow member. The follower member is operatively associated with and selectively positionable on the hollow member to provide an indication of the zero position of the adjusting screw.

26 Claims, 3 Drawing Sheets

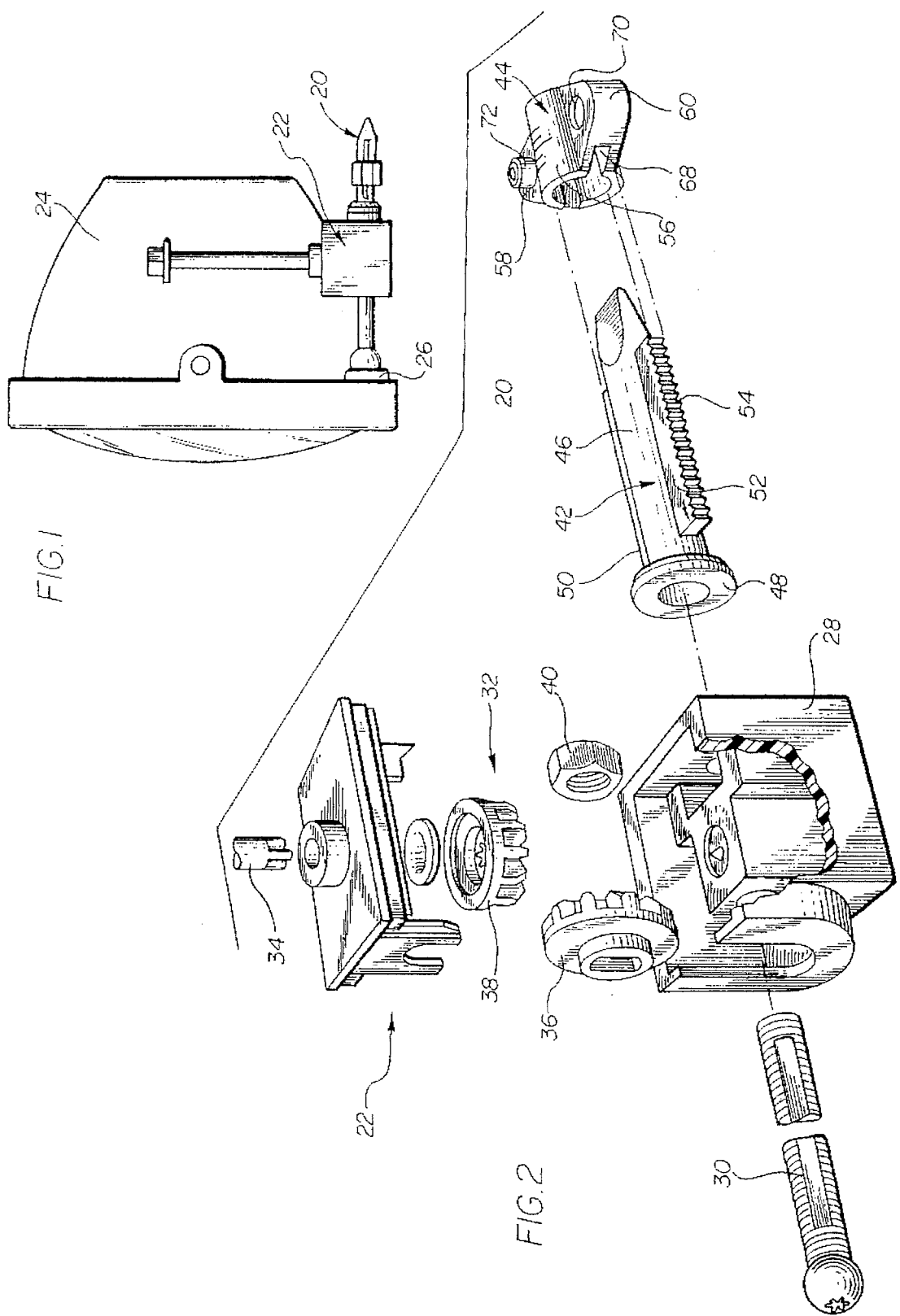

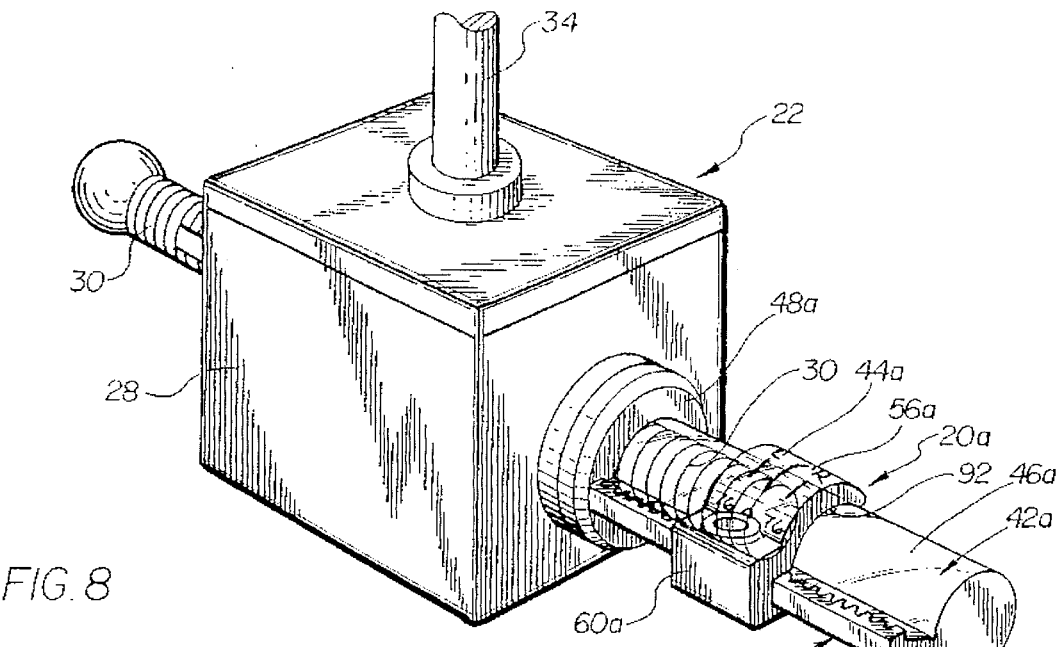
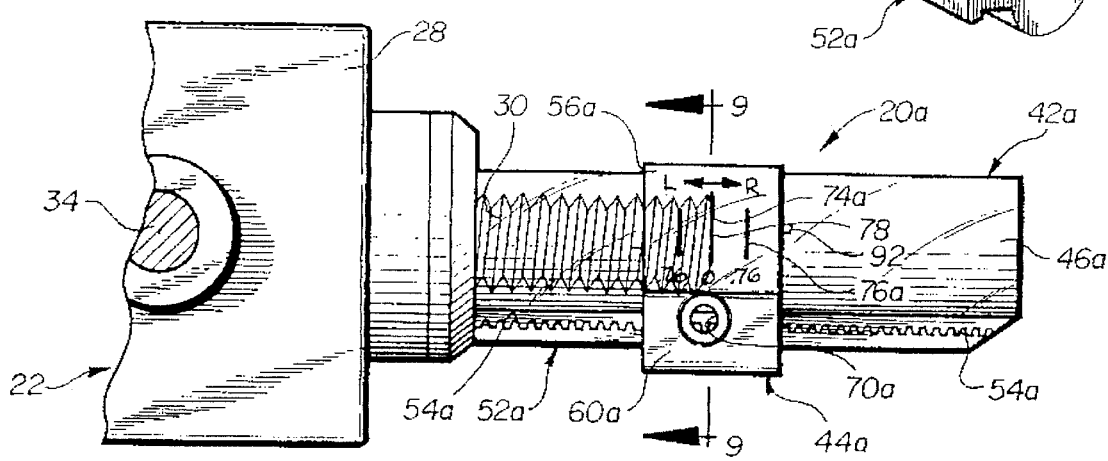
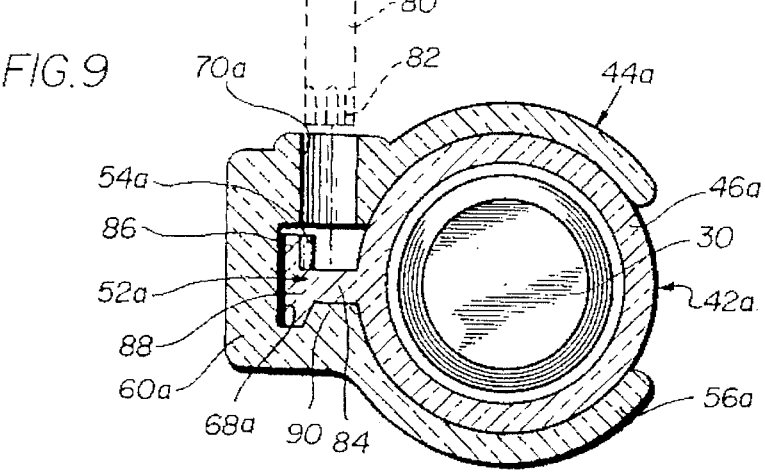

HORIZONTAL ZERO INDICATOR ASSEMBLY

BACKGROUND OF THE INVENTION

The present invention generally relates to an indicator assembly for use with an adjusting mechanism for positioning a movable headlamp component in an automobile or the like at an initial or "zero" position. More particularly, the invention contemplates an indicator assembly that is adjusted to denote the zero position when the headlamp component is initially positioned and to thereafter indicate where the zero position for the headlamp component is located.

Following assembly of an automobile, the headlamps must be set to their desired position. This is generally accomplished by use of sophisticated photometric metering equipment and manually adjusting the headlamps until the headlamps point in the desired location.

Adjustor mechanisms for adjusting the aiming of a headlamp component to a desired location are well-known in the art. Examples of existing prior art adjustor mechanisms can be found in U.S. Pat. Nos. 5,309,780; 5,121,303; 5,067,052; 5,032,964; 4,939,945; 4,893,219 and 4,674,018. These types of adjustor mechanisms generally use a gear box that consists of a pair of gears, a housing, caps, bushing, washer, and an adjusting screw or shaft.

Due to vibration or an accident, the headlamps may move out of the desired aiming location. With certain prior art adjustor mechanisms, there is no way to attain the desired initial position or alignment without use of specialized equipment. With the present invention, the zero position of the movable headlamp component is indicated and the mechanic need only adjust the position of the headlamp component by using the adjustor mechanism to move the headlamp component back to its zero position.

OBJECTS AND SUMMARY OF THE INVENTION

A general object of the present invention is to provide a novel indicator assembly that is used with an adjustor mechanism.

An object of the present invention is to provide an indicator assembly that has a visual indicator that allows for ease of adjusting and for the accurate adjustment of a headlamp component to a zero position.

Briefly, and in accordance with the foregoing, the present invention discloses an indicator assembly, which is used with an adjusting mechanism, to designate an initial or "zero" position of a movable headlamp component. The adjusting mechanism includes a housing, an adjusting screw which is disposed through the housing, and a driving mechanism which is operatively associated with the screw. A first end of the screw is operatively associated with a movable headlamp component.

The indicator assembly includes a hollow, vial-like member which is attached to the housing and a follower member. The second end of the screw is enclosed within the hollow member. The follower member is operatively associated with and selectively positionable on the hollow member to provide an indication of the zero position of the adjusting screw.

To designate the zero position of the movable headlamp component, the driving mechanism is driven thereby producing axial displacement of the screw to moving the headlamp component until the headlamp component is in a desired position. The follower member is translated on the hollow member until a predetermined portion of the follower member is aligned with a predetermined portion of the adjusting screw. When the predetermined portions are aligned, the zero position of the headlamp component is designated. After the predetermined portions are aligned the follower member is locked in position on the hollow member in such a manner so that substantial relative movement between the follower member and the hollow member is prevented.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 1 is a schematic side elevational view of an indicator assembly used in a headlamp adjusting mechanism which incorporates the features of the invention;

FIG. 2 is an exploded perspective view of an indicator assembly and a headlamp adjusting mechanism which incorporates the features of a first embodiment;

FIG. 7 is a perspective view of an indicator assembly used in a headlamp adjusting mechanism which incorporates the features of a second embodiment of the invention;

FIG. 8 is a partial plan view of the indicator assembly of FIG. 7 in a zero position; and FIG. 9 is a cross-sectional view of the indicator assembly and a partial, elevational view of the headlamp adjusting mechanism along line 9—9 of FIG. 8.

DETAILED DESCRIPTION OF THE PREFERRED EMBODIMENT

Figure 3:
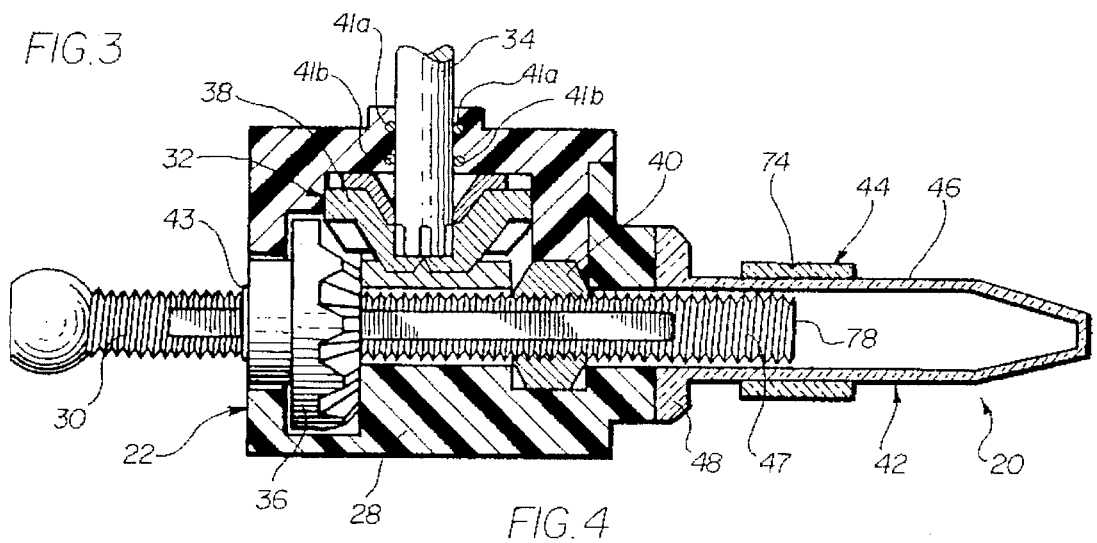
FIG. 3 is a partial cross-sectional view of the indicator assembly and headlamp adjusting mechanism which incorporates the features of the invention in a zero position.

While the invention may be susceptible to embodiment in different forms, there is shown in the drawings, and herein will be described in detail, embodiments with the understanding that the present disclosure is to be considered an exemplification of the principles of the invention, and is not intended to limit the invention to that as illustrated and described herein.

Referring now to the drawings, an indicator assembly 20 which is used with a headlamp adjustor mechanism 22 is shown in FIG. 1 in a schematic form. The headlamp adjustor mechanism 22 is attached to a movable headlamp component 24 by a ball socket joint 26.

The headlamp adjustor mechanism 22 used in the present invention is of a known construction as disclosed in U.S. Pat. No. 5,309,780, which disclosure is herein incorporated by reference. While a specific headlamp adjustor mechanism 22 is shown in the drawings and described herein, it is to be understood that the type of adjustor mechanism that is used with the novel indicator assembly 20 of the present invention is not limited to the specific embodiment shown and one skilled in the art may devise or select various modifications.

The headlamp adjustor mechanism 24 generally includes a housing 28 and an elongated threaded adjusting shaft or screw 30. The threaded adjusting screw 30 is disposed through a passage in the housing 28 and is rotatable and axially displaceable relative to the housing 28.

A driving mechanism 32 is seated or disposed within the housing 28 and is operated by a drive component 34, which may take the form of a pre-assembled drive shaft, as shown, or a removable drive tool. The driving mechanism 32, when driven by the drive component 34, causes the rotation and axial displacement of the threaded adjusting screw 30 which displacement is used to adjust the position of the headlamp component 24 in a known manner. The drive component 34 is inserted into the housing 28 and is rotated to drive the driving mechanism 32.

The driving mechanism 32 includes a first mitered gear 36 and a second mitered gear 38, each of which are operatively associated with the housing 28. The first gear 32 encircles the adjusting screw 30. The drive component 34 is inserted into the housing 28, and engages the second gear 38, as shown in FIG. 3. When the drive component 34 is rotated by an operator or mechanic, rotation is imparted to the second gear 38 which imparts rotation to the first gear 36 which, in turn, causes the adjustor screw 30 to rotate and translate. The driving mechanism 32 includes a canted threaded nut 40 which is engaged with the threaded portion of the adjustor screw 30 to increase prevailing torque and reduce axial play and axial deflection of the screw 30 within the housing 28. Also, since the nut 40 is fixed against rotation within the housing 28, as the adjusting screw 30 rotates relative to the nut 40, the screw 30 will move axially. In this regard, the gear 36 has a non-circular bore in which the adjusting screw 30 is engaged with the non-threaded flats on the adjusting screw 30, permitting the screw 30 to rotate with the gear 36, while also moving axially or translating. It is this axial or translatory movement of the adjusting screw 30 which is used to effect positioning of the headlamp component 24.

The housing 28 includes O-rings 41a, 41b, 43 to seal the housing 28 against the entry of dirt and moisture into the housing 28. O-rings 41a, 41b encircle the drive component 34 and an O-ring 43 encircles the adjusting screw 30.

The indicator assembly 20 of the present invention will now be considered. A first embodiment of the indicator assembly 20, as shown in FIGS. 2–6, is described first. Thereafter, a second embodiment of the indicator assembly 20, as shown in FIGS. 7–9, is described. Like components in the second embodiment to that of the first embodiment are designated with like numerals except that the suffix "a" is used to denote the second embodiment.

As shown in FIGS. 2–6, the indicator assembly 20 includes an encapsulator member 42 and a follower member 44. The encapsulator member 42 and the follower member 44 are transparent.

The encapsulator member 42 is a generally cylindrical, one piece, hollow vial 46 that surrounds and completely encloses the rear end 47 of the adjusting screw 30 as shown in FIG. 3. The vial 46 is substantially transparent and is made of a suitable material, such as plastic.

The front end of the encapsulator member 42 terminates in a flange 48 which is ultrasonically welded, glued or otherwise affixed to the rear of the housing 28 to seal the rear portion of the housing 28 against the entry of dirt and moisture into the housing 28. An initial, elongate, smooth guide flange or rib 50 projects outwardly from the vial 46. Diametrically opposed to the rib 50 is an elongate rack portion 52 which also projects outwardly from the vial 46. The rack 52 includes a series of teeth 54 thereon. The rib 50 and the rack 52 extend axially along a portion of the length of the vial 46.

The follower member 44 of the indicator assembly 20 is preferably, but not necessarily, a one piece member that encircles the vial 46. The follower member 44 is substantially transparent and is made of a suitable material, such as plastic.

The follower member 44 has a generally cylindrical body portion 56 which encircles the vial 46 with first and second portions, 58 and 60, respectively which project outwardly from the body portion 56. The projecting portions 58, 60 are diametrically opposed to each other along the body portion 56.

The first projecting portion 58 includes an elongate slot or guide track 62 therein which extends along the entire length of the follower member 44 and a first transverse aperture 64 along its top side and a second transverse aperture 66 along its bottom side. The apertures 64, 66 are aligned with each other. One or both aperture 64 or 66 may be threaded to accept locking fastener 72, as described hereinafter. The second projecting portion 60 includes an elongate slot or guide track 68 therein which extends along the entire length of the follower member 44 and a transverse aperture 70 in its top side. When the follower member 44 is disposed on the vial 46, the rib 50 of the vial 46 is aligned with and disposed in the slot 62 and the rack 52 is aligned with and disposed in the slot 68. The apertures 64, 66 are positioned outwardly of the rib 50. A locking fastening member 72, such as a TORX® screw, is seated within the apertures 64, 66 and extend through the first projecting portion 58. The aperture 70 is aligned with the teeth 54 of the rack 52 for reasons described hereinafter.

The follower member 44 is provided with an indicia 74, such as a number, to denote the initial or "zero" position of the headlamp component 24. This indicia 74 may be flanked by additional indicia 76, such as numbers, to denote variance from the zero position.

Having described the construction of the first embodiment of the indicator assembly 20 and the adjusting mechanism 22, the method for using these components will be described. After assembly of the automobile, the headlamp component 24 is moved to the desired or initial position using factory alignment techniques and equipment through operation of the adjustor mechanism 22 and movement of the adjusting screw 30 by employing the drive component 34 as described hereinabove.

Figure 4:
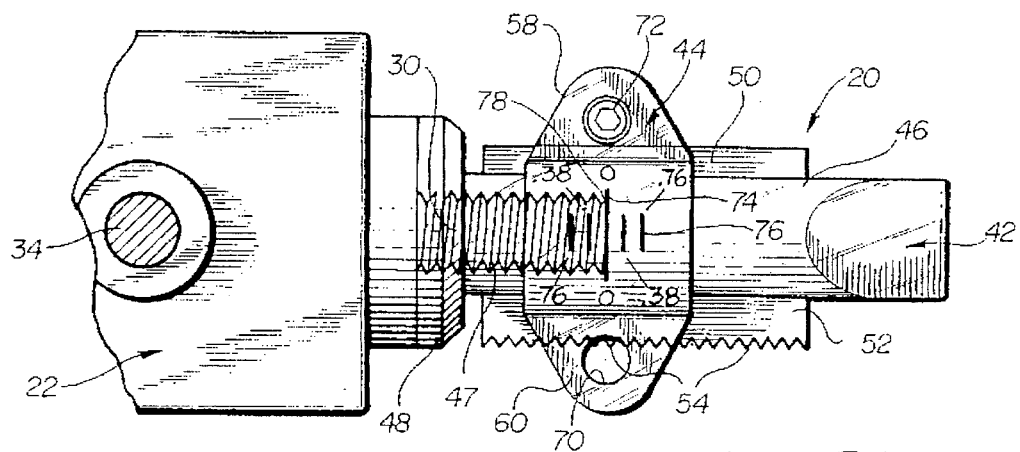
FIG. 4 is a partial plan view of the indicator assembly of FIG. 3 in the zero position.

Once the desired initial position of the headlamp component 24 is reached which is termed the "zero" position, the initial or "zero" position of the headlamp component 24 is denoted by translating the follower member 44 along the vial 46 until the zero indicia 74 on the follower member 44 is aligned with a predetermined portion of the adjustor screw 30 in the present illustrated embodiment, the terminus or end of the screw 30. As shown in FIGS. 3 and 4, the zero indicia 74 aligns with the end 78 of the screw 30 to denote the zero position. Alternatively, the screw 30 may be provided with a marking (not shown) along its length to denote the point at which the follower member 44 is to be aligned with the screw 30 at the time of initial positioning.

Figure 6:
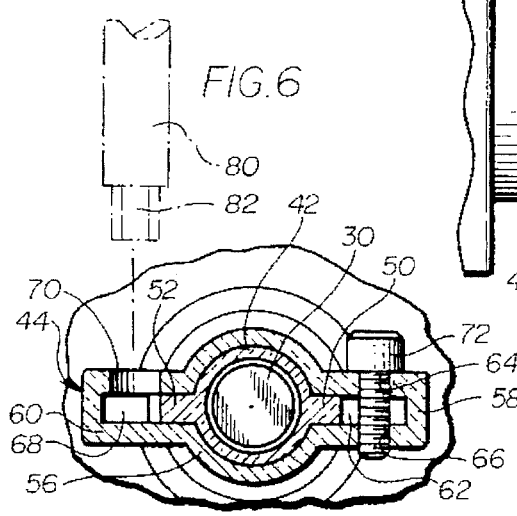
FIG. 6 is a cross-sectional view of the indicator assembly and a partial, elevational view of the headlamp adjusting mechanism along line 6—6 of FIG. 5.

To translate the follower member 44 along the vial 46, an operator or mechanic inserts a splined drive tool 80, as shown in FIG. 6, into the aperture 70 and rotates the drive tool 80. With regard to the drive tool 80, it should be noted that it is preferred to employ a TORX® head 82 on the drive tool 80 which will mate with the teeth 54 and can also be used to service the adjusting screw 72. Alternatively, any standard splined drive head may be used. When the head 82 of the drive tool 80 is inserted through the aperture 70, the head 82 engages the teeth 54 of the rack 52 and when the drive tool 80 is rotated, the follower member 44 translates along the length of the vial 46 with the rib 50 sliding within the slot 62 and the rack 52 sliding within the slot 68.

Once the zero indicia 74 and the predetermined portion of the adjustor screw 30 (shown as the end 78 of the adjustor screw 30 in the drawings) are aligned, the follower member 44 is locked into place by tightening the fastening or locking screw 72 to substantially prevent relative movement between the follower member 44 and the vial 46. If a TORX® screw 72 is used and a TORX® head 82 is provided on the drive tool 80, the fastening screw 72 may be tightened using this tool 80. Since the one piece follower member 44 is made of a plastic material, the plastic will flex sufficiently to tighten the screw 72 without shattering the follower member 44. Alternatively, the follower member 44 may be made of two portions (not shown) so that when the screw 72 is tightened, the portions are clamped together.

Figure 5:
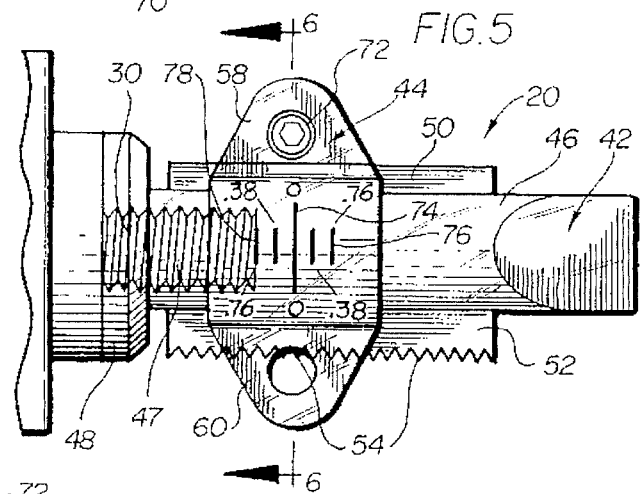
FIG. 5 is a partial plan view of the indicator assembly of FIG. 3 in a misaligned position.

During operation of the vehicle, the headlamp component 24 may move out of the desired position due to vibration, accidents or the like. As shown by the variance indicia 76 in FIG. 6, the headlamp component 24 has moved 0.76 out of alignment with respect to the zero position denoted by reference numeral 78. When this occurs, the predetermined portion of the adjustor screw 30, shown as the end 78 of the adjustor screw 30 in FIGS. 3 and 4, and the zero indicia 78 will become misaligned as shown in FIG. 5. When this occurs, and a mechanic desires to adjust the headlamp component 24 back to its initial position, the mechanic need merely to rotate the drive component 34 to drive the driving mechanism 32 to thereby produce rotation and axial movement of the adjusting screw 30 as explained hereinabove. The mechanic merely continues to rotate the drive component 34 until the predetermined portion 78 of the screw 30 is realigned with the zero indicia 74 on the follower member 44 as shown in FIG. 4. When this occurs, the mechanic can be relatively assured that the headlamp component 24 has been moved back to the initial or zero position.

The second embodiment of the indicator assembly 20a shown in FIGS. 7–9 is similar to the first embodiment shown in FIGS. 2–6 and, as such, only the differences will be described.

The transparent encapsulator member 42a includes only a T-shaped rack portion 52a projecting outwardly from the vial 46a. Thus, the rib 50 as shown in the first embodiment has been eliminated in this embodiment.

The T-shaped rack portion 52a includes an arm portion 84 with an upper portion 86 and a lower portion 88 projecting from the distal end of the arm portion 84. A series of teeth 54a are provided on the inner surface of the upper portion 84 of the T-shaped rack portion 52a. The rack 52a extends axially along the length of the vial 46a. The rack 52a may extend axially along only a portion of the vial 46a as shown in the first embodiment.

The transparent follower member 44a of the indicator assembly 20a is a one piece member that has a generally cylindrical body portion 56a which generally encircles the vial 46a with a portion 60a which projects outwardly from the body portion 56a. The cylindrical body portion 56a as illustrated does not completely encircle the vial 46a, however, it is to be understood that the body portion 56a could completely encircle the vial 46a without departing from the scope of the invention.

The projecting portion 60a includes an elongate slot or guide track 68a therein which extends along the entire length of the follower member 44a and a transverse aperture 70a in its top side. The guide track 68a includes a projecting portion 90 along its inner surface. When the follower member 44a is disposed on the vial 46a, the rack 52a is aligned with and disposed in the slot or guide track 68a. The arm portion 84 and the lower portion 88 of the T-shaped rack 52a abut the projecting portion 90. The aperture 70a is aligned with the teeth 54a of the rack 52a.

Now the method for using the second embodiment of the indicator assembly 20a and the adjusting mechanism 22 will be briefly described. The method for using the second embodiment of the indicator assembly 20a is similar to that of the first embodiment and, as such, only the differences will be noted.

Once the zero position of the headlamp component 24 is reached, the zero position of the headlamp component 24 is denoted by translating the follower member 44a along the vial 46a until the zero indicia 74a on the follower member 44a is aligned with a predetermined portion of the adjustor screw 30. To translate the follower member 44a along the vial 46a, a mechanic inserts a splined drive tool 80 into the aperture 70a and rotates the drive tool 80a. When the head 82 of the drive tool 80 is inserted through the aperture 70a, the head 82 engages the teeth 54a of the rack 52a and when the drive tool 80 is rotated, the follower member 44a translates along the length of the vial 46a with the rack 52a sliding within the slot or guide track 68a. The arm portion 84 and the lower portion 88 of the T-shaped rack portion 52a abut the projecting portion 90 on the inner surface of the guide track 68a and slide therealong when the follower member 44a is translated along the vial 46a.

Once the zero indicia 74a and the predetermined portion of the adjustor screw 30 (shown as the end 78 of the adjustor screw 30 in the drawings) are aligned, the follower member 44a is locked into place to substantially prevent relative movement between the follower member 44a and the vial 46a. This may be done by the mechanic placing a drop of glue 92 on the outside surface of the vial 46a such that the drop of glue 92 contacts both the vial 46a and the follower member 44a. Alternatively, friction may be used to hold the follower member 44a securely on the vial 46a.

While preferred embodiments of the present invention are shown and described, it is envisioned that those skilled in the art may devise various modifications of the present invention without departing from the spirit and scope of the appended claims. The invention is not intended to be limited by the foregoing disclosure.

The invention claimed is:

1. An indicator assembly for use with an adjusting mechanism, said adjusting mechanism being used to adjust the position of a movable headlamp component, said adjusting mechanism including a housing member having a passage formed therein; an elongated, threaded adjusting screw disposed in said passage of said housing member, said adjusting screw having a first end and second end, said first end operatively associated with a movable headlamp component; structure for driving said elongated adjusting screw, said driving structure operatively associated with said screw for driving said screw to produce axial displacement of said screw so as to move said movable headlamp component, said indicator assembly comprising:

a hollow member connected to said housing member, said hollow member extending around said second end of said adjusting screw and a follower member operatively associated with said hollow member and selectively positionable on an exterior surface of said hollow member and slidable along said exterior surface of said hollow member for providing an indication of a zero position of said adjusting screw.

2. An indicator assembly as defined in claim 1, wherein said hollow member is a cylindrical vial formed of a clear material which encloses said second end of said screw.

3. An indicator assembly as defined in claim 1, wherein said follower member is comprised of a one-piece member.

4. An indicator assembly as defined in claim 1, wherein said follower member includes structure thereon for denoting the zero position of the headlamp component such that when said headlamp component is in the zero position, a predetermined portion of said second end of the adjusting screw is aligned with the structure for denoting the zero position.

5. An indicator assembly as defined in claim 4, wherein said structure for denoting the zero position comprises indicia.

6. An indicator assembly as defined in claim 5, wherein said indicia includes an indication of variance from the zero position of the headlamp component.

7. An indicator assembly for use with an adjusting mechanism, said adjusting mechanism being used to adjust the position of a movable headlamp component, said adjusting mechanism including a housing member having a passage formed therein; an elongated, threaded adjusting screw disposed in said passage of said housing member, said adjusting screw having a first end and second end, said first end operatively associated with a movable headlamp component; structure for driving said elongated adjusting screw, said driving structure operatively associated with said screw for driving said screw to produce axial displacement of said screw so as to move said movable headlamp component, said indicator assembly comprising:

hollow member connected to said housing member, said hollow member extending around said second end of said adjusting screw; a follower member operatively associated with and selectively positionable on said hollow member for providing an indication of a zero position of said adjusting screw; and further including structure for preventing movement between said follower member and said hollow member once said zero position is indicated.

8. An indicator assembly as defined in claim 7, wherein said structure for preventing movement between said follower member and said hollow member comprises a screw.

9. An indicator assembly as defined in claim 7, wherein said structure for preventing movement between said follower member and said hollow member comprises glue which contacts both of said hollow member and said follower member.

10. An indicator assembly for use with an adjusting mechanism, said adjusting mechanism being used to adjust the position of a movable headlamp component, said adjusting mechanism including a housing member having a passage formed therein; an elongated, threaded adjusting screw disposed in said passage of said housing member, said adjusting screw having a first end and second end, said first end operatively associated with a movable headlamp component; structure for driving said elongated adjusting screw, said driving structure operatively associated with said screw for driving said screw to produce axial displacement of said screw so as to move said movable headlamp component said indicator assembly comprising:

a hollow member connected to said housing member, said hollow member extending around said second end of said adjusting screw and a follower member operatively associated with and selectively positionable on said hollow member for providing an indication of a zero position of said adjusting screw;

said hollow member including a series of teeth on a surface thereof which are complementarily shaped to a drive tool, said follower member including an aperture therein which is aligned with said teeth, said follower member being translatable on said hollow member upon the engagement of said drive tool with said teeth and the rotation of said drive tool with respect to said teeth.

11. An indicator assembly as defined in claim 10, wherein said hollow member includes a rack on an outside surface thereof on which said teeth are provided.

12. An indicator assembly as defined in claim 11, wherein said follower member includes a guide track on an inside surface thereof and said rack slides along said guide track when said follower member is selectively positioned on said hollow member.

13. An adjusting mechanism for adjusting the position of a movable headlamp component to a zero position and thereafter denoting the zero position of the movable headlamp component comprising:

a housing member having a passage formed therein;

an elongated, threaded adjusting screw disposed in said passage of said housing member, said adjusting screw having a first end and second end, said first end operatively associated with said movable headlamp component;

structure for driving said elongated adjusting screw, said driving structure operatively associated with said screw for driving said screw to produce axial displacement of said screw so as to move said movable headlamp component;

a hollow member connected to said housing member, said hollow member extending around said second end of said adjusting screw; and a follower member operatively associated with said hollow member and selectively positionable on an exterior surface of said hollow member and slidable along said exterior surface of said hollow member for providing an indication of a zero position of said adjusting screw.

14. An adjusting mechanism as defined in claim 13, wherein said hollow member is a cylindrical vial formed of a clear material which encloses said second end of said screw.

15. An adjusting mechanism as defined in claim 13, wherein said follower member is a one-piece member.

16. An indicator assembly as defined in claim 13, wherein said hollow member includes a rack on an outside surface thereof on which said teeth are provided.

17. An indicator assembly as defined in claim 16, wherein said follower member includes a guide track on an inside surface thereof and said rack slides along said guide track when said follower member is selectively positioned on said hollow member.

18. An adjusting mechanism as defined in claim 18, wherein said follower member includes structure thereon for denoting the zero position of the headlamp component such that when said headlamp component is in the zero position, a predetermined portion of said second end of the adjusting screw is aligned with the structure for denoting the zero position.

19. An adjusting mechanism as defined in claim 18, wherein said structure for denoting the zero position comprises indicia.

20. An adjusting mechanism as defined in claim 19, wherein said indicia includes an indication of variance from the zero position of the headlamp component.

21. An adjusting mechanism for adjusting the position of a movable headlamp component to a zero position and thereafter denoting the zero position of the movable headlamp component comprising:

housing member having a passage formed therein;

an elongated, threaded adjusting screw disposed in said passage of said housing member, said adjusting screw having a first end and second end, said first end operatively associated with said movable headlamp component;

structure for driving said elongated adjusting screw, said driving structure operatively associated with said screw for driving said screw to produce axial displacement of said screw so as to move said movable headlamp component;

a hollow member connected to said housing member, said hollow member extending around said second end of said adjusting screw: and a follower member operatively associated with and selectively positionable on said hollow member for providing an indication of a zero position of said adjusting screw; and further including structure for preventing movement between said follower member and said hollow member once the zero position is indicated.

22. An adjusting mechanism as defined in claim 21, wherein said structure for preventing movement between said follower member and said hollow member comprises a screw.

23. An indicator assembly as defined in claim 21, wherein said structure for preventing movement between said follower member and said hollow member comprises glue which contacts both of said follower member and said hollow member.

24. An adjusting mechanism for adjusting the position of a movable headlamp component to a zero position and thereafter denoting the zero position of the movable headlamp component comprising:

a housing member having a passage formed therein;

an elongated threaded adjusting screw disposed in said passage of said housing member, said adjusting screw having a first end and second end, said first end operatively associated with said movable headlamp component;

structure for driving said elongated adjusting screw, said driving structure operatively associated with said screw for driving said screw to produce axial displacement of said screw so as to move said movable headlamp component;

a hollow member connected to said housing member, said hollow member extending around said second end of said adjusting screw; and a follower member operatively associated with and selectively positionable on said hollow member for providing an indication of a zero position of said adjusting screw;

said hollow member including a series of teeth on a surface thereof which are complementarily shaped to a drive tool, said follower member including an aperture therein which is aligned with said teeth, said follower member being translatable on said hollow member upon the engagement of said drive tool with said teeth and the rotation of said drive tool with respect to said teeth.

25. A method of designating a zero position for a movable headlamp component comprising the steps of:

providing an adjusting mechanism comprising a housing member having a passage formed therein; an adjusting screw disposed in said passage of said housing member, said adjusting screw having a first end and second end, said first end operatively associated with the movable headlamp component; a driving mechanism operatively associated with said screw; a hollow member connected to said housing member and extending over said second end of said adjusting screw; a follower member operatively associated with said hollow member and selectively positionable on an exterior surface of said hollow member and slidable along said exterior surface of said hollow member;

driving said driving mechanism to drive said screw to produce axial displacement of said screw thereby moving said headlamp component until said headlamp component is in a desired position; and translating said follower member along said external surface of said hollow member until a predetermined portion of said follower member is aligned with a predetermined portion of said adjusting screw such that when said predetermined portions are aligned, the zero position of said movable headlamp component is designated.

26. A method of designating a zero position for a movable headlamp component comprising the steps of:

providing an adjusting mechanism comprising a housing member having a passage formed therein: an adjusting screw disposed in said passage of said housing member, said adjusting screw having a first end and second end, said first end operatively associated with the movable headlamp component; a driving mechanism operatively associated with said screw; a hollow member connected to said housing member and extending over said second end of said adjusting screw; a follower member operatively associated with and selectively positionable on said hollow member;

driving said driving mechanism to drive said screw to produce axial displacement of said screw thereby moving said headlamp component until said headlamp component is in a desired position:

translating said follower member on said hollow member until a predetermined portion of said follower member is aligned with a predetermined portion of said adjusting screw such that when said predetermined portions are aligned, the zero position of said movable headlamp component is designated: and fixing said follower member on said hollow member such that substantial relative movement between said follower member on said hollow member is prevented once the zero position is designated.

* * * * *

UNITED STATES PATENT AND TRADEMARK OFFICE
CERTIFICATE OF CORRECTION

PATENT NO. : 5,544,023
DATED : August 6, 1996
INVENTOR(S) : Karl R. Schmitt and David M. Mosnot It is certified that error appears in the above-indentified patent and that said Letters Patent is hereby corrected as shown below:

Column 8, Line 63 "as defined in claim 18," should be
-- as defined in claim 13, --

Signed and Sealed this

Eighteenth Day of February, 1997

Attest:

BRUCE LEHMAN

*Attesting Officer*      *Commissioner of Patents and Trademarks*